United States Patent [19]
Alles

[11] 4,112,258
[45] Sep. 5, 1978

[54] COMMUNICATION SYSTEM USING INTELLIGENT NETWORK PROCESSOR

[75] Inventor: Harold Gene Alles, Bridgewater, N.J.

[73] Assignee: Bell Telephone Laboratories, Incorporated, Murray Hill, N.J.

[21] Appl. No.: 841,365

[22] Filed: Oct. 12, 1977

[51] Int. Cl.² .................... H04J 3/00; H04Q 3/54
[52] U.S. Cl. .................... 179/15 AT; 179/15 BL; 179/18 BC; 179/18 ES
[58] Field of Search ........ 179/15 AT, 15 AQ, 18 BC, 179/18 B, 15 BL, 16 F, 18 EA, 18 ES

[56] References Cited
U.S. PATENT DOCUMENTS

| 3,809,819 | 5/1974 | Stephens | 179/15 AQ |
| 3,816,668 | 6/1974 | Giesken | 179/18 EA |
| 3,934,091 | 1/1976 | Stidham | 179/15 AT |
| 3,978,290 | 8/1976 | Sarma | 179/15 AT |
| 3,997,730 | 12/1976 | Stidham | 179/18 BC |
| 4,032,719 | 6/1977 | Blasbalg | 179/15 AQ X |
| 4,054,755 | 10/1977 | Lee et al. | 179/15 AT |
| 4,071,701 | 1/1978 | Leijonhufvud et al. | 179/15 AT |
| 4,074,072 | 2/1978 | Christensen et al. | 179/15 AQ |

Primary Examiner—Thomas W. Brown
Attorney, Agent, or Firm—Charles S. Phelan

[57] ABSTRACT

Multibit digital signals, being telephone call signal samples from different simultaneous call connections and coded in an ordered coding system, are stored in different locations of a first buffer store. The respective signals are coupled through a stored program controlled switching processor to randomly selectable locations of a second buffer store for transmission to corresponding respective different call destinations. A register is provided in the switching processor for temporarily storing each signal as it is coupled through the processor. Also included in the processor is the capability for additional selectable processing of those coupled signals en route.

29 Claims, 7 Drawing Figures

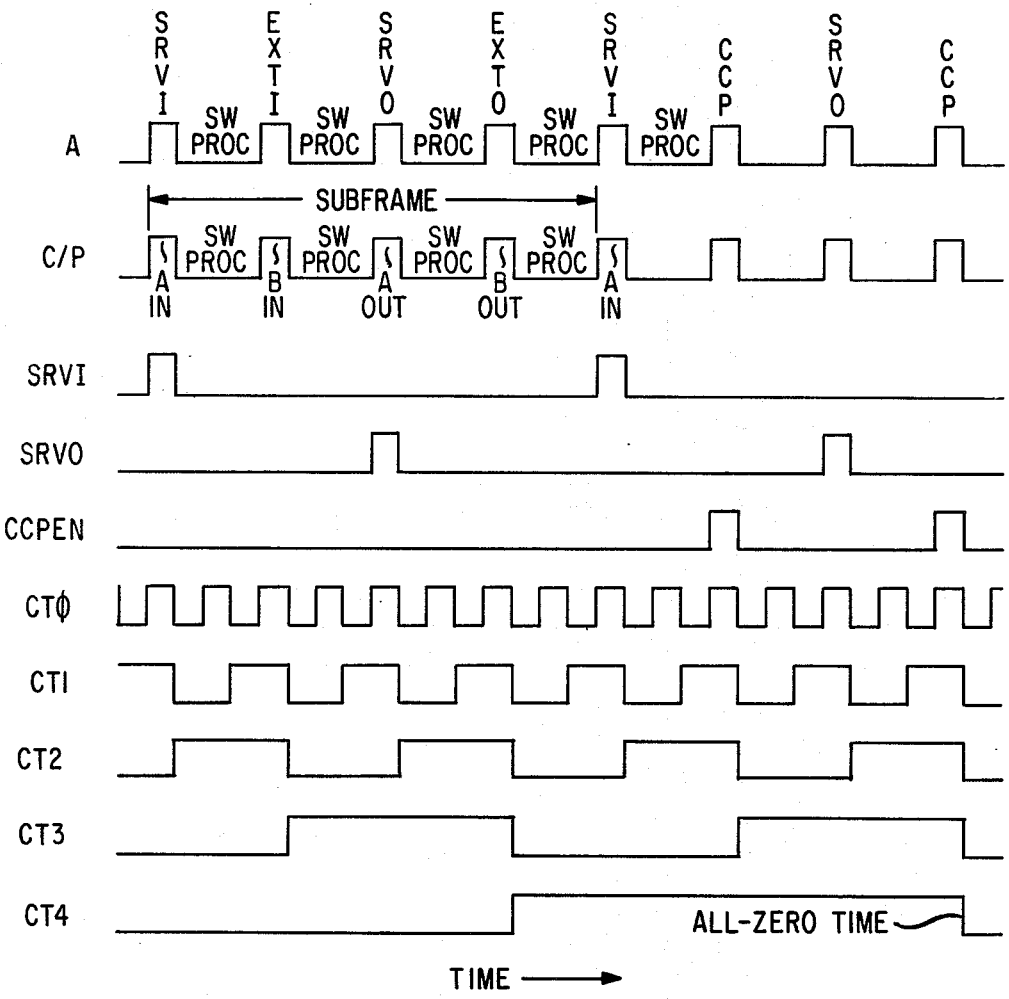

COMMUNICATION SYSTEM USING INTELLIGENT NETWORK PROCESSOR

BACKGROUND OF THE INVENTION

1. Field of the Invention

This invention relates to communication system switches through which digitally coded call signals are coupled to effect call switching.

2. Prior Art

Various types of signal switches are known in the art and some examples include space division switching matrices, resonant transfer systems, and systems in which pairs of time gated subscriber lines are interconnected through a time-shared bus. Most of the existing switching systems have been primarily designed for handling continuous analog signals or discrete samples of such analog signals. However, the space division matrices have been utilized, often in conjunction with time slot interchangers, for switching digitally coded signal samples. In addition, techniques are known for effecting limited call signal switching by writing digitally coded signal samples into a buffer memory and then reading them out in appropriate time slots to effect their transfer to a second party on a call connection. However, none of the foregoing systems has convenient arrangements for processing call signals for, e.g., custom insertion of loss or gain to compensate in part for factors such as different line lengths between the switch and the subscriber's terminal equipment.

In prior art switching systems the conference capability has often been satisfied by employing an add-on type of conference bridge in which call signals of all conference participants are combined and the combined result is returned to each individual participant's line circuit where that particpant's input signal is substantially subtracted out. The need to balance these conference circuits against signal regeneration is a problem that is usually present, and it becomes particularly acute as the number of conference participants increases. Here again the conference bridge usually serves no other useful purpose in the system in the absence of a current need for the conferencing function. Electronic switching systems, to the extent that they have been applied to the switching of digitally coded signals, can provide many services to subscribers by utilization of the common control processor capabilities, but those services usually are limited to call administration services as distinguished from call signal modification services. In addition, such systems still generally depend upon the employment of separate, controlled, space division switching matrix for call path switching; and they generally are not deemed to be practical for processing call signals for providing, e.g., customized loss or gain in individual call connections.

It is, therefore, one object of the present invention to improve communication system switches.

It is another object to facilitate the provision of special services in addition to the primary call signal switching service performed by a system switch.

SUMMARY OF THE INVENTION

The foregoing and other objects of the invention are realized in an illustrative embodiment in which call signal samples for plural call connections are coupled from a first sample buffer store, in any order regardless of call signal destination, to a second sample buffer store at locations predetermined by respective predetermined destinations for each sample for effecting call switching.

In one embodiment the coupling is performed by a signal processor which includes selectably programmable facilities for processing the call signals in transit through the processor in order to effect other switching system functions.

It is a feature of one embodiment of the invention that the switching processor includes multiple programmably selectable signal paths each including at least one program-clocked register in the path between input and output ports of the processor in order to keep signal ripple paths relatively short to facilitate operation at speeds in excess of those usually found in communication system processors presently available in the art.

It is another feature that the instruction repertoire of the switching processor is devoid of jump instructions and employs instead conditionally executable instructions in order to facilitate the aforementioned high-speed type of processor operation.

An additional feature of the invention includes switching processor cooperation with additional switching office elements such as call communication paths into and out of the office, office clock supplies, scanning and service processors, and a common control processor in a fashion which is analogous to that in which a conventional switch cooperates with such additional switching office elements.

It is yet another feature of one embodiment of the invention that the switching processor communicates through a first memory region with circuits bearing call signals to and from the switch and communicates through a second memory region with service circuits of types commonly known in the art for providing call communication administration functions such as tone generation and detection, and dialed digital analysis. The second memory region also advantageously includes a scratch pad memory area for facilitating the processing of computations required of the switching processor in the performance of certain selected switching functions.

Still another feature of the invention involves the inclusion in the switching processor of a clocked pointer register which is loadable from either the processor input or its output and which register has its output selectably applicable for addressing either of the aforementioned two memory regions in substitution for address signal sources otherwise provided by a program counter or program memory outputs.

It is an additional feature that a plurality of switches of the type described can be conveniently interconnected to enlarge the overall traffic handling capacity.

BRIEF DESCRIPTION OF THE DRAWING

A more complete understanding of the invention and its various objects, features, and advantages may be obtained from a consideration of the following detailed description in connection with the appended claims and the attached drawings in which

FIG. 5 illustrates typical program memory instruction output fields for data converting instructions, for data moving instructions, and for arithmetic/logic instructions in the switching processor;

FIG. 6 is a timing diagram illustrating selected operations of the switching processor of FIGS. 2 and 3.

DETAILED DESCRIPTION

Figure 1:
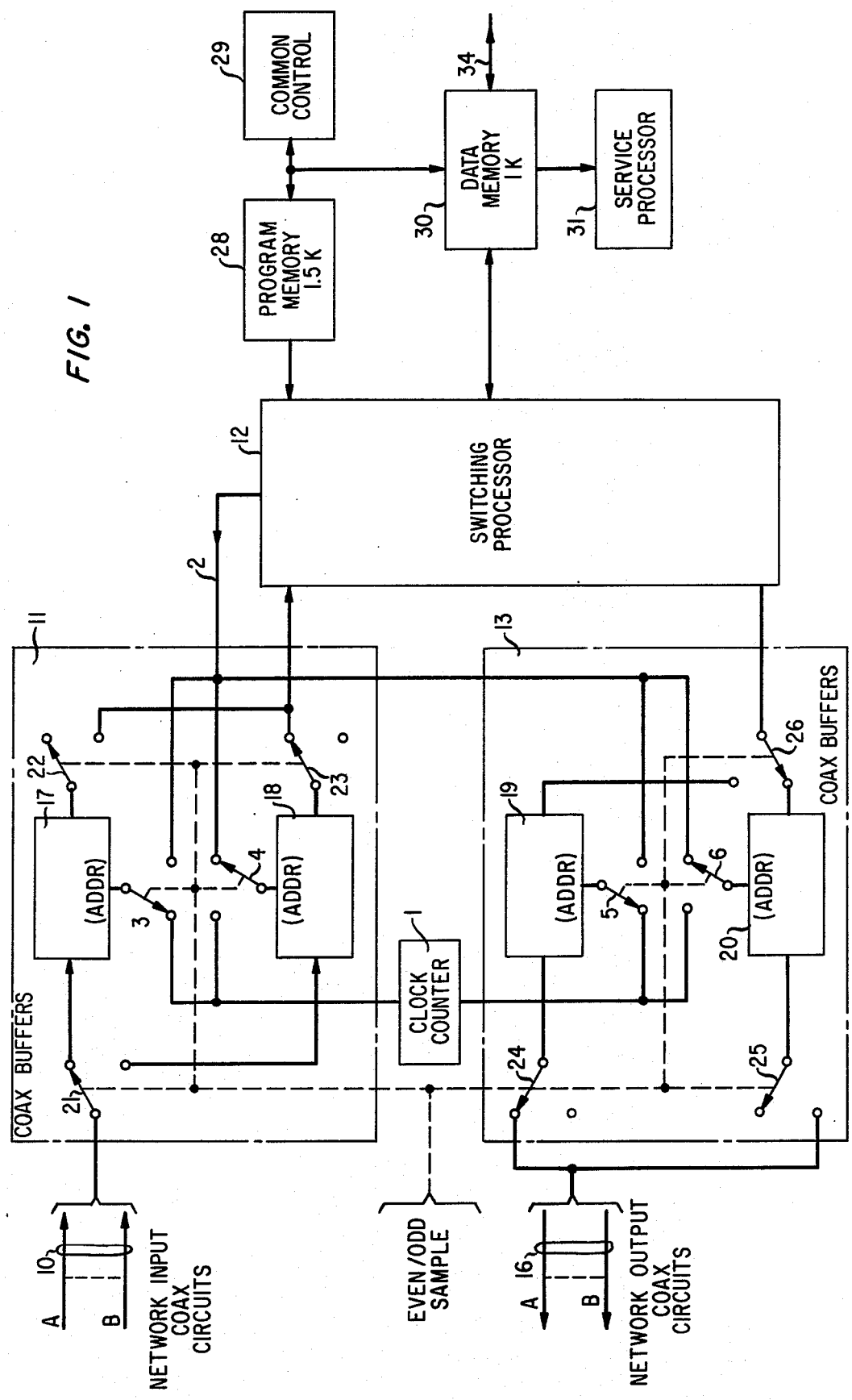
FIG. 1 is a simplified block diagram of an overall communication switching office utilizing a switch module according to the present invention.

FIG. 1 illustrates a communication call signal switching office. This office operates on various types of samples of communication call signals. It is assumed for purposes of illustration that each sample is at least one bit of a coded digital signal, and in most cases the sample is a multibit coded digital signal sample. This office will for convenience of description be described primarily in terms of the switching of digitally coded telephone system signals. It is to be understood, however, that the switching office is similarly applicable for the switching of other digitally coded signals such as data signal samples transmitted between different business machines.

Digitally coded signals from terminal equipment of telephone system subscribers or other network users (not shown) are, in a telephone-type parlance, supplied from one party on a talking path continued in one of coaxial input circuits 10 and are coupled to an input buffer store 11. From the store 11 the signals are coupled through a switching processor 12 to an output buffer store 13 for further coupling on a listening path to the other party for each call connection. The listening paths are included in one or more coaxial output circuits 16. In a typical digital communication system each of the coaxial input circuits 10 and the output circuits 16 advantageously includes many multiplexed digital signal samples, and in one system 128 16-bit samples from 128 subscriber lines are included on a single coaxial circuit in each sample period. For convenience of description the input signals to the store 11 are sometimes called "mouth signals" and the output signals of store 13 are sometimes called "ear signals".

Each of the stores 11 and 13 is divided into two memories or memory areas. These include memories 17 and 18 in store 11 and memories 19 and 20 in store 13. In one illustrative communication system each of the coaxial cables is operated at a 16.384 megabit/second rate, and that rate is herein simply designated 16mb/s or 16M. In such operation bit series signals are digitally coded in an ordered positional coding scheme such as, for example, a companded pulse code modulation coding system of a type that is being increasingly used in the art. In such a companded system eight bits of code are used to define 256 possible signal amplitude levels, 128 positive and 128 negative. Such a system provides a resolution equivalent to 13 bits of code in a linear pulse coding system.

In each office sample time, i.e., a time in which a full digitally coded call sample from every source on any given input coaxial line is received, the two memories of each store 11 and 13 serve different functions, and in the following office sample time they exchange functions under control of an office clock derived signal EVEN-/ODD SAMPLE shown in FIG. 1. Such alternating memory functions sometimes cause the term "ping-pong" operation to be applied to the store. Discrete ganged switches 21 through 23 in store 11 and 24 through 26 in store 13 are utilized for schematically representing this type of operation for coded digital signal paths, and the ganging to the EVEN/ODD signal schematically represents simultaneous control of those switches in response to the office clock.

In the illustrated positions for those switches in FIG. 1, digitally coded mouth signal samples of all input coaxial circuits 10 are loaded into the memory 17 while processed ear signal samples are simultaneously being applied to the output coaxial circuits 16 from the memory 19. At the same time mouth samples from all of the input coaxial circuits 10 which had been stored in the memory 18 during a prior sample time are now coupled through the switching processor 12 for appropriate switching and any other necessary processing prior to being stored in randomly selectable locations in the output memory 20 according to the proper routing of each call signal. In the next office sample time the switches 21 through 26 are operated to their illustrated alternate positions to interchange the functions of the memories 18 and 20 to communicate with the coaxial circuits while the memories 17 and 19 provide input buffer and output buffer functions, respectively, for call sample data to be processed in the switching processor 12.

Data signal samples are advantageously coupled between the processor 12 and the buffer stores 11 and 13 in bit parallel fashion. The schematic representations of those stores are considered to include any additional logic not separately shown which is appropriate for converting between the digital signal format utilized on the coaxial circuits and the digital signal format utilized by processor 12.

Memories 17-20 of FIG. 1 are each addressed from either a clock counter 1 or the switching processor outputs, to be described, on a functional circuit 2. The selection between those two sources is schematically represented in the drawing by additional switches 3-6 ganged to be operated together with the switches 21-26 by the EVEN/ODD sample number signal in synchronism with the operation of clock counter 1. As illustrated, memories 17 and 19 are coupled to the input and output coaxial cables, respectively, and are addressed with the same address information from the counter 1. Similarly, the memories 18 and 20 are coupled to the processor circuit; and one or the other is addressed at any given time by signals from that circuit. This arrangement can handle 16 coaxial circuits in and out assuming 16M coaxial operation and use of the processor 12 to be described.

Operation of the switching processor 12 will be discussed in detail in connection with FIGS. 2 and 3. It is sufficient at this point to make several observations of rather general significance. The switching processor 12 cooperates with the stores 11 and 13 to effect a nonblocking type of switching operation. That processor is advantageously a microprocessor type of unit that not only effects switching to make any coaxial circuit time-space input path connectable to any other coaxial time-space output path to effect multiple duplex call connection paths, but it also effects selectable additional processing of signals coupled through the processor 12. That additional processing is applied as determined by the nature of the individual subscriber signal path, e.g., inserting customized gain or loss to facilitate the achievement of a predetermined loss level requirement for the office. Additional processing is also applied according to the nature of a particular call connection, e.g., computations for conferencing or for customized multiplexing of plural input subscriber signals onto a single output time-space channel.

Operation of the switching processor 12 is determined by a program memory 28 which illustratively has a capacity of approximately 1500 words. That memory is written by a common control 29 to contain a separate subroutine (examples to be described) for each call connection to be processed by the processor 12 in effecting coupling from store 11 to store 13. The memory 28 is completely read in response to office-clock-generated address signals once during each office sample time. For each such call connection the subroutine defines a mouth signal location in either of the memories of the input store 11 and it further defines at least one register in the processor 12 to which that mouth signal is to be moved. The subroutine also defines any necessary custom processing for the corresponding subscriber line and call involved, and it names a register in either of the memories of the output store 13 (or in a temporary storage register in a processor data memory 30) to which the processed ear signal is to be moved.

These switching processor subroutines are not required to be executed in any special sequence because all call connections are necessarily so processed once during each sampling period. This is possible because during any given office sample time, there are available to processor 12 on a randomly addressable basis in one memory of store 11 input samples of all calls taken in the previous office sample time as a data source, and all locations of one memory in store 13 are available on a randomly addressable basis as a data sink for output samples of all calls for the next office sample time.

The common control 29 performs typical switching system stored program control functions for servicing a communications switch. It includes a scanning processor (not separately shown) for observing the states of individual subscriber lines (not shown) served by the system and the respective signals of which appear in digitally coded form in some convenient time-interleaved format on the coaxial circuits 10 and 16. The common control also includes a processor which is required for responding to requests for changes in service being accorded to the subscriber lines, system maintenance, and resource allocation (maintaining in memory maps and tables of the state of utilization of office equipment such as the operating memories).

One commercially available processor employed in an embodiment of the type here described is the LSI-11 microcomputer of the Digital Equipment Corporation and described as to hardware (including bussing arrangements), system software, applications, and maintenance in the *DIGITAL Microcomputer Handbook* of that corporation published in 1976. For example, the common control processor responds to new on-hook or off-hook conditions. The common control processor also effects necessary number translations and initiates corresponding call path changes by writing or erasing appropriate subroutines in the program memory 28. One typical number translation produces, from the directory number of either a calling or a called party, the types of services the particular subscriber is entitled to. Also included in such a translation output for an embodiment of the present invention is an indication of the level of gain or loss to be applied by the switching processor 12 to signals of various amplitudes for any particular subscriber line in order to achieve a predetermined system loss level plan. The translation output also indicates whether or not signals for that subscriber must be in a linear or a companded coding form.

The data memory 30 communicates data bidirectionally as to the common control 29, the switching processor 12, or a service processor 31. One embodiment of the present invention involves sufficient reserve capacity in processor 12 and data memory 30 to permit the latter memory to service similarly at least one additional port 34 communicating with external equipment, but that reserve capability is not generally further considered in following description. The memory 30 is addressed from one of various selectable sources (not shown in FIG. 1) including a pointer register in switching processor 12 for employing computed addresses, a command register in processor 12 for providing addresses according to processor instructions, the office clock counter for providing periodic sequential address, and the common control processor in common control 29 for providing additional computed or programmed access to the memory.

Data memory 30 has two principal functions. One of these is to provide in a service area a buffer store, analogous to the stores 11 and 13, to provide communication between switching processor 12 and the service processor 31. For example, during times which are of interest for network administration common control 29 sets a mouth signal path from the calling party location in input store 11 to the switching processor 12 and then to a specified address in the service area of memory 30 prior to being relayed to the service processor 31. This type of signal might include, for example, dialing signals received from a calling line. Similarly, through ear signal paths to calling and called subscribers, service processor 31 generates signals which are moved from that processor to the service area of data memory 31 and from there to switching processor 12 on the way to the output store 13. These types of signals might include, for example, dial tone signals, or ringback signals for a calling party, or ringing signals for a called party. Likewise, through a mouth signal path from the called party, ringing signal information is used by the service processor to detect called subscriber off-hook condition for accomplishing ring-trip functions.

Memory 30 also includes a scratch pad area to provide temporary storage for holding a value produced in the performance of switching processor 12 operations, either during network signal processing or when off-line in a call sense, which must be held for future use. The expression "network signal processing" has reference to digital call sample switching and in some cases, modification by processor 12. One example of the scratch pad function is the use of a location in that area for accumulating input mouth signal amplitudes for a conference signal summation.

Figure 2:
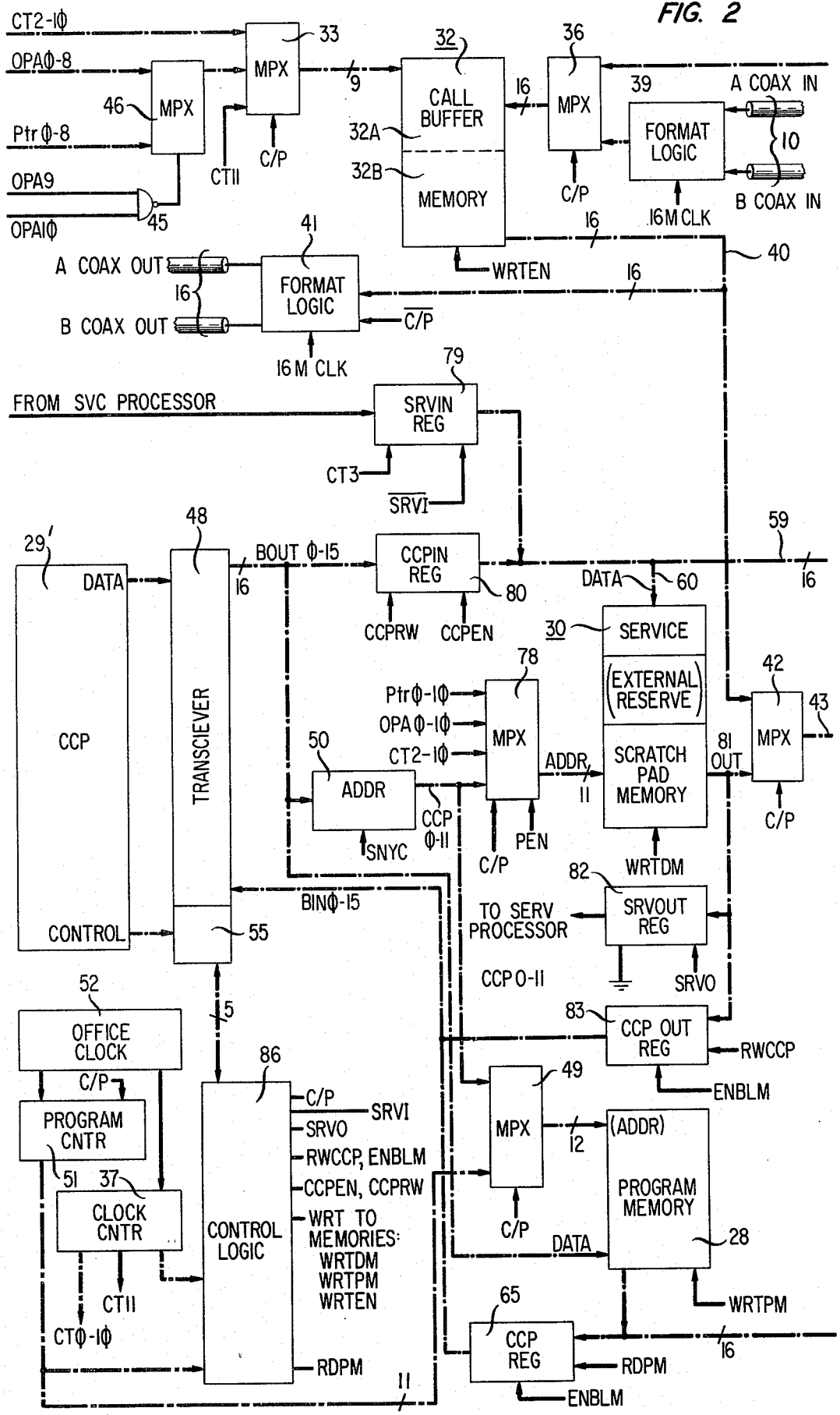
FIGS. 2 through 4 comprise a more detailed block diagram of the memories and switching processor utilized in the office of FIG. 1.
Figure 3:
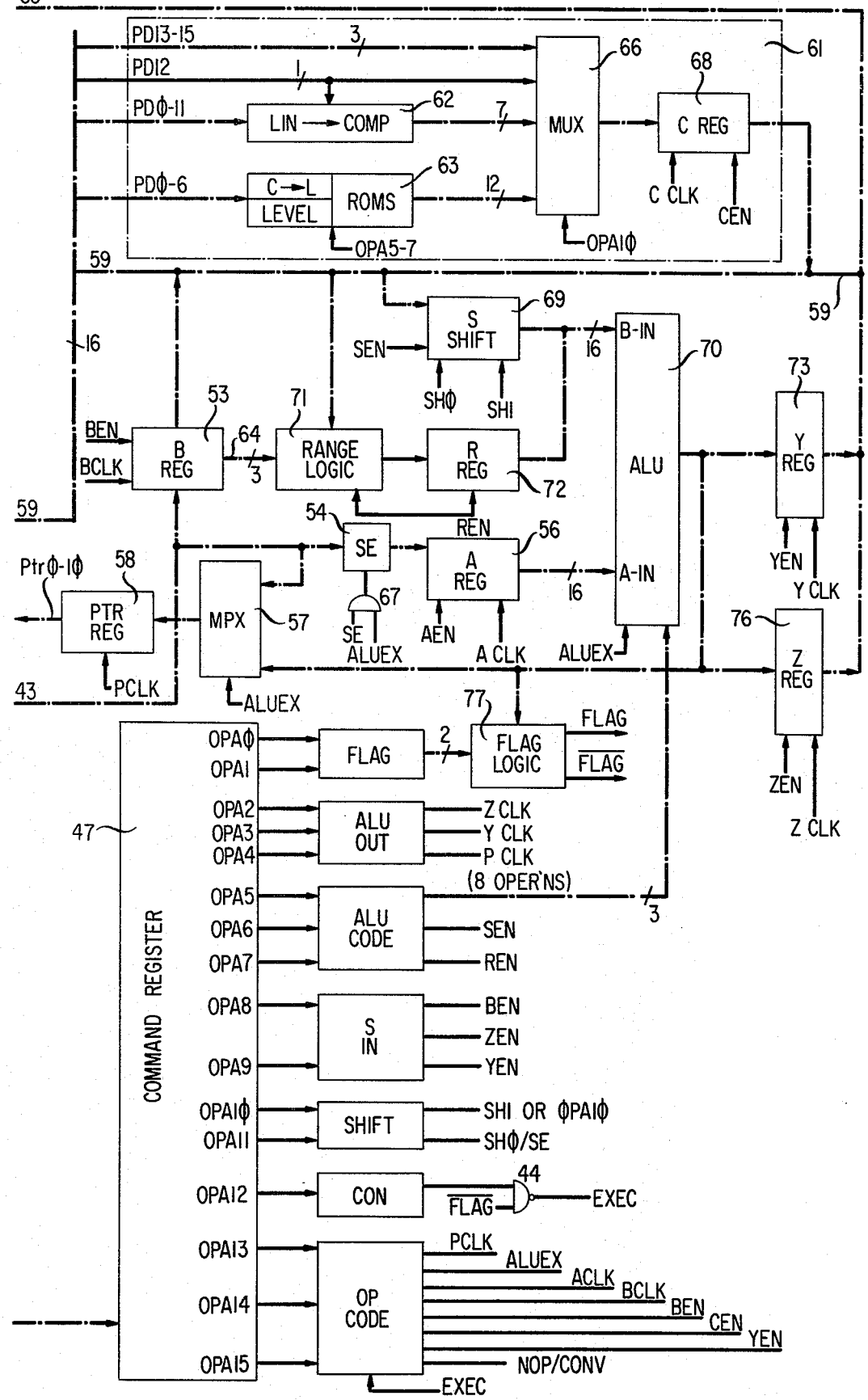
Figure 4:
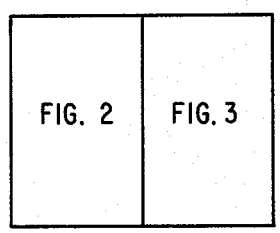

FIGS. 2 and 3 comprises a block and line diagram, when assembled together as indicated in FIG. 4, indicating in greater detail the structure and cooperation of the buffer store function and the switching processor 12 in association with the common control through the program and data memories. All of the indicated blocks are either commercially available integrated circuits or are made up in a straightforward way from such circuits to produce certain logical functions to be described. The assemblage of these elements, however, represents a microprocessing combination that allows performance of the switching processor 12 in the new way described to enhance communication switching facilities.

The switching processor 12 and associated circuits are advantageously driven in synchronous fashion by an office clock 52 which is, for purposes of illustration, operated at a frequency of approximately 16 MHz. Output from this clock drives a binary clock counter 37 (corresponding to counter 1 in FIG. 1) to produce output counter bits CT $\phi$-10 to various locations of the switching processor 12 and its associated circuits. Output of the counter 37 is also applied to a circuit designated control logic 86 which produces additional functional clock signals for controlling those associated circuits. An additional counter output signal CT 11 is separately provided for a purpose to be noted.

A program counter 51 is also driven by the output of the clock 52. However, this counter also receives a C/P signal from the control logic 86 and which is utilized within the counter to inhibit application of every fourth pulse from the clock 52 so that program counts are correspondingly interrupted for a purpose to be described. Output from the program counter 51 is applied through a multiplexer 49 for addressing the program memory 28 as will be subsequently further described. That is an 11-bit output as indicated by the diagonal line across the illustrated lead and by the associated number 11. In addition, output from the counter 51 is also applied to the control logic 86.

The logic 86 responds to outputs from clock counter 37 and program counter 51, as well as to additional interface control signals supplied from the common control processor 29' by way of coupling logic 55, for generating signals shown on output leads of the logic 86. Some of those signals are periodic and others are dependent at least in part on control signals from common control processor (CCP) 29' in order to reconcile the clocked switching processor 12 operation with the operation of the CCP 29' which is asynchronous as to the switching processor 12.

The principal periodic signals from logic 86 are illustrated in FIG. 6 and include signals designated C/P, SRVI, SRVO, and CCPEN for purposes to be described. That figure also shows the five least significant stage outputs CT$\phi$-CT4 of counter 37, and an all-ZERO count state for those stages appears toward the right-hand side of the diagram. The CT$\phi$ output is from the first stage and thus shows an 8 MHz rate since the counter is driven by 16 MHz pulses from clock 52. The C/P signal from logic 86 has a 4 MHz rate with a duty cycle such that it includes one pulse, of the width of a CT$\phi$ pulse, every four clock times. This signal is used to time divide access to a single memory 32, corresponding to the memories 17-20 in FIG. 1, between the coaxial circuits 10 and 16 (C/P high) and the processor 12 (C/P low). Wave A in FIG. 6 is the same as the wave C/P, but it has different legends to show when several of the signals of logic 86 appear during times of access to the memory 32, i.e., while switching processor 12 is disabled for lack of instruction because program counter 51 is then disabled as already noted. Logic 86 signals indicated by the legends are SRVI, SRVO, and CCP, as well as EXTI and EXTO relating to the aforenoted additional port 34 on data memory 30. Signals corresponding to those first three legends are also shown in FIG. 2.

Signals provided through the coupling logic 55 are typical of those provided for an interfacing function beteen processors and include, for example, from the CCP 29' a synchronizing signal SYNC, and additional signals indicating either that the CCP 29' needs to take in signals from the switching processor 12 or it needs to send out signals to that processor and its associated memory circuits. In addition, a signal is typically provided from the processor 12 by way of control logic 86 constituting a processor reply signal advising CCP 29' that previously requested data has been assembled and is ready in an output buffer register, to be described, for the CCP 29'.

Output signals from control logic 86 are utilized primarily for controlling the loading and the output enabling functions of different interface registers associated with the processor memories and the CCP 29'. These control signals are in some cases illustrated in the timing diagram of FIG. 6, and their mode of utilization is otherwise outlined in the following description of the interface logic between CCP 29' and the switching processor memories.

A transceiver 48 provides bidirectional coupling of data and address signals between that and CCP 29' on a bidirectional 16-bit bus. Transceiver 48 illustratively uses type 8T38 transceivers of the Signetics Corporation. Also associated with the transceiver 48 is a unidirectional 16-bit input bus designated BIN $\phi$-15 for receiving data and address signals from the memories associated with the switching processor 12. Similarly, a 16-bit output bus designated BOUT $\phi$-15 supplies data and address signals from the common control processor to those memories. The direction of coupling of signals in transceiver 48 at any one time is controlled by well-known logic within the schematic representation of that register and which normally couples signals therethrough in the outward direction from CCP 29' in the absence of a control signal indicating the coincidence of a CCP signal requesting data and a switching processor signal indicating by its reply signal state that the data is ready.

Several applications are made of the BOUT $\phi$-15 signal bits from transceiver 48. They are directly applied to the program memory 28 to supply input data which loads that memory with the appropriate program routine instructions to control the processor 12 for effecting call signal switching and processing. The same signals BOUT $\phi$-15 are also coupled to a buffer register CCPIN 80 as data for loading the data memory 30. Signals are clocked into the register 80 by a CCPRW signal from control logic 86 and which is produced upon occurence of the CCPEN signal wave pulse in FIG. 6 following a coupling control signal from logic 55 indicating that the CCP 29' needs to send data to data memory 30. Output from register 80 is enabled by the regularly occurring CCPEN signal from logic 86. Thus, the register output is periodically enabled for loading data memory 30 whether or not there is actually new data present in the register 80 but loading into memory 30 takes place only on the WRTDM signal from logic 86. The signals BOUT $\phi$-15 are also applied to an address register 50 upon occurrence of the aforementioned SYNC signal from CCP 29'. This address information in register 50 is continuously available to another input of the multiplexer 49 for addressing program memory 28. That multiplexer is controlled by the C/P signal to apply outputs of register 50 during times of coaxial access to memory 32 and apply outputs of counter 51 during times of processor 12 access to memory 32.

Further in connection with loading data into program memory 28, a WRTPM signal from logic 86 enables writing into that memory. This signal appears at CCPEN clock time pulse of FIG. 6 following control and address signals from CCP 29' indicating that common control needs to write the program memory. CCP 29' is advantageously equipped with resource allocation capability of a type well known in the art for shifting stored information in memory 28 as call paths are set up and taken down to assure adequate contiguous storage locations for each new subroutine to be stored.

Two sources for the BIN φ-15 signals to transceiver 48 are shown in FIG. 2. One of these is from the data output of program memory 28 by way of a CCP register 65. That register is cloced by an RDPM function clock signal from logic 86 which is derived form a signal from the coupling logic 55 indicating the CCP 29' needs to read output data from the program memory 28. Output of CCP register 65 is enabled by an ENBLM signal from logic 86 indicating that CCP 29' needs to receive data from this register and that a synchronizing signal from the processor 29' has been received; and that register 65 has been loaded from program memory 28, i.e., reply is ready. An additional source for the signals BIN φ-15 is a CCPOUT register 83 which has data clocked into it upon occurrence of the RWCCP signal from logic 86 after occurrence of a signal from CCP 29' indicating that it needs data from this source. Similarly, output from register 83 to the transceiver 48 is enabled asynchronously by the aforementioned ENBLM signal on an indication that CCP 29' needs data from this source.

Additional interface coupling is provided between switching processor 12 and service processor 31 by way of data memory 30 and buffer registers SRVIN 79 and SRVOUT 82. Register 79 is advantageously loaded from the service processor by the clock counter bit CT3; however, in some applications it is more convenient to provide that type of clocking signal from the service processor 31. Output from register 79 to memory is enabled by the FIG. 6 periodic SRVI signal appearing as an output of logic 86. Similarly, register 82 is loaded from memory 30 by the periodic SRVO signal, and its output is continuously enabled for whenever the service processor samples it.

The remainder of the present description is concerned with the switching processor 12 details and its operation with respect to signals coupled by that processor between different parts of memory 32 with the cooperation of the data memory 30 and under the control of the program memory 28 and common control 29. In FIG. 2 the call buffer memory 32 represents the combined functions of the memories 17–20 in FIG. 1. Memory 32 is addressed by a single set of address signals at a time from a multiplexer 33, and input data is supplied through a multiplexer 36. Both multiplexers are controlled by the clock-derived signal C/P which allows coaxial line access to the memory 32 during one out of every four clock times of the office clock and for allowing switching processor 12 access to the memory 32 during one or more of the remaining ones of the four clock times.

Call buffer memory 32 is a single memory provided to perform the aforementioned ping-pong type memory function described in connection with the four memories 17–20 of FIG. 1. The single memory 32 in FIG. 2 is operated on a time-shared basis to make efficient use of a single commercial memory array for a small office of the size illustrated, i.e., 256 subscribers. Employing commercial memories with the technique described in connection with FIG. 1 usually results in an array that is suitable for larger offices, but has a great deal of unused memory space when applied to the small office situation. For example, for purposes of illustration a processor 12 with an 11-bit instruction address field is capable of handling about 350 subscribers (256 indicated for the illustrative embodiment); but by suitably enlarging the address field and increasing pipelining in instruction execution, the same type of processor is capable of handling about 2,000 subscribers at the same 16 MHz clock rate of operation.

In FIG. 2 the A- and B-input coaxial cables 10 are coupled through format logic 39 of any type which is suitable for changing the digital coded signal sample format from the coaxial cables to a format that allows the memory 32 to provide those signals to the switching processor 12 in a way that is convenient for signal processing. In the illustrative embodiment that contemplates digitally pulse coded samples, the format which is convenient for processing is a word series, bit parallel format in which the bits of each word appear in conventionally ordered bit positions for the coding rule employed. In typical commercial transmission systems PCM signals are usually transmitted in a bit series, word series format on plural coaxial cables. Consequently, the latter signals must be converted to the bit parallel, word series format with sample words from the coaxial cables A and B time interleaved, i.e., alternated in the illustrative embodiment. The logic 39, which is clocked by the 16 MHz output of the clock 52 accomplishes this function and supplies the word interleaved signal train to an input of multiplexer 36. Several different techniques are known in the art for accomplishing the necessary format conversion. One example is to use shift registers to accomplish the conversion from series to parallel format for each coaxial cable and then to use a clocked multiplexer to interleave the bit parallel samples.

Multiplexer 36 is controlled by the aforementioned C/P periodic clock signal to interleave, between successive sample words from the logic 39, three similarly structured, digitally coded signal samples from an output port circuit 38 of the switching processor 12. Output from multiplexer 36 is applied as the data input to the call buffer memory 32.

Data output from memory 32 appears on an output port circuit 40 and is coupled through another format logic circuit 41 which effects operations that are the reverse of those of the logic 39 for applying digitally coded signal samples in bit series and word series format to the respective A- and B-output coaxial cables 16. Output from memory 32 is also applied to an input of a multiplexer 42 which supplies signals to an input port circuit 43 of the switching processor 12 in FIG. 3. The C/P signal enables the input from memory 32 to multiplexer 42 only during processor access times of the C/P signal in FIG. 6 and enables operation of logic 41 only during coaxial circuit access times of the same signal wave. During the latter access times multiplexer 42 couples output of memory 30 to port circuit 43.

Memory 32 is in FIG. 2 divided into upper and lower parts 32A and 32B which correspond for example to the FIG. 1 memory pairs 17, 19 and 18, 20, respectively. That is, in sample time when one part, e.g., 32A, is being accessed for the coaxial cables the other part, e.g., 32B, is being accessed for the switching processor 12; and those accesses are time divided as illustrated in wave C/P of FIG. 6. During times of coaxial circuit access, the circuits are given the access in a recurring sequence A-IN, B-IN, A-OUT, B-OUT as illustrated. In the next sample time the functions of the two memory parts are exchanged, and that exchange is in FIG. 2 effected by the EVEN/ODD sample time signal CT 11 which causes addresses to affect different regions of memory 32.

Addressing of memory 32 is effected through the multiplexer 33 which chooses between two sets of input signals according to the dictates of the C/P signal. Nine bits of address plus the CT 11 signal are utilized by multiplexer 33 is such a way as to address the various word locations in memory 32 to produce, to outward appearances, the same read-out and write-in space capabilities as were described for the FIG. 1 memories 17–20. During the coaxial cable part of the time division, memory 32 is addressed by clock counter signals CT 2-1$\phi$; and during the processor part of the time divisions, it is addressed by processor-developed addresses PA $\phi$-8 form a multiplexer 46. That multiplexer selects between two additional sets of input address signals in accordance with the state of the processor instructions bits OPA9,1$\phi$ as NANDed in gate 45 to choose between instruction address bits OPA $\phi$-8 and pointer register address bits PTR $\phi$-8. The accessability of the call buffer memory 32 from the pointer register is an additional element of system flexibility, but it is not used in routine network signal processing.

Processor-supplied addresses for memory 32 provide random access to the memory. However, it can be seen from FIG. 6 and the counter supplied addresses CT2-1$\phi$ that sequential coaxial cable in and out signal samples are alternated across the memory 32 word location in memory part 32A and again in memory part 32B. This assures full utilization of the 1024 locations in memory 32; and since counter signals CT2-1$\phi$, rather than CT$\phi$-8, are used, no locations are skipped during the three-clock-time intervals when only processor 12 can access memory 32. A WRTEN signal from control logic 86 enables writing in memory 32 during each of the in-coaxial circuit times in the FIG. 6 C/P timing wave. The write function is also enabled during switching processor parts of the C/P wave when the processor instruction calls for moving data to memory 32.

Processor 12 is shown in FIG. 3 and is controlled by instructions provided from the program memory 28 in FIG. 2, by way of a command register 47. Data appearing at the processor input port circuit 43 is selectably applied to one or more of a B-register 53, an A-register 56, or a multiplexer 57 through which it is applied for storage in a pointer register 58. The aforementioned registers are all three-state latch flip-flop registers of a type well known in the art in which signals are loaded in parallel when the register inputs are clocked and from which signals are derived in bit parallel when the register output is enabled by being driven to a low impedance condition in which the information stored during a prior input clocking time becomes available. When not so enabled, the register outputs are in a high impedance condition in which the stored information states are not available at the outputs. The pointer register 58 output is typically continuously enabled by a ground signal not separately shown in the drawing. It is, however, apparent at this point that each of the various possible paths for the transmission of data from the input port circuit 43 through the processor 12 necessarily includes at least one clocked register.

The output of B-register 53 is applied to a processed data bus 59 on which signals appear with the identification PD$\phi$-15. That bus is connected to the processor output port circuit 38 which, in turn, extends to an input of the memory 32 data input multiplexer 36. Processed data bus 59 also extends to the data input port 60 of data memory 30 and to input connections for code converting circuit 61, the output of which is also applied after further clocking to the bus 59.

Code-converting circuit 61 is intended to perform a selectable one of the signal format changes of converting linear pulse coding to companded coding, companded coding to linear coding, and companded to companded with selectable different levels of gain or loss. All 16 of the bit signals PD$\phi$-15 are applied to circuit 61 at all times. Bits PD$\phi$-11 are specifically applied to a wired logic linear-to-companded converter 62, which also receives PD12 (the sign bit of 13-bit linearly coded data). Converter 62 operates according to a known converting algorithm to produce a seven-bit companded output including three segment number output bits and four amplitude defining bits applicable to any segment. Those seven bits are coupled to one set of inputs of a multiplexer 66.

Also included in circuit 61 are a group of read only memories (ROM) collectively designated 63. Six are illustratively included in circuit 61, and all are addressable by processed data bus bits PD$\phi$-6 defining 128 different magnitudes (addresses in ROM) in a companded coding system. Processor 12 instruction bits OPA5-7, to be described, select one of the six ROMs 63 to read out according to the address information previously calculated and stored data according to the function assigned to that ROM. One of those functions is the companded to linear conversion, and the other five are (companded to companded) 2, 3, 5, and 6 dB of attenuation and 2 dB of gain. ROMs 63 provide 12 output bits (for companded outputs only the 7 least significant bits contain information) to a second set of inputs to the multiplexer 66.

The multiplexer 66 is controlled by the signal state of instruction bit OPA1$\phi$ to select either the companded output of converter 62 or the output (linear or companded) of ROMs 63. The selected signal set is coupled through to be loaded into a C-register 68 when a CCLK signal is present. A subsequent processor move instruction causes a CEN signal to enable the output of register 68 to bus 59 to be available for clocking to a suitable destination. Each set of inputs to multiplexer 66 also has connections to pass the processed data bus bits PD13-15 through with either set since these are available for use as control bits to be employed in the office for communication between common control and subscriber line interface units. In addition the multiplexer has connections to put the sign bit PD12, from linear input signals to circuit 61, into the correct, i.e., the eighth, output bit position for the companded output of converter 62. Similarly, coincidence logic, not shown, responsive to the states of instruction bits OPA5-7 places the sign bit in the eighth bit position for companded outputs of ROMs 63 and allows the eighth bit of ROM output to pass through multiplexer 66 for linearly coded outputs.

Another possible path for signals in the processor 12 is through a shifter 69 from the processed data bus 59 to a B-input of an arithmetic/logic unit (ALU) 70. The shifter is advantageously a type 25510 shifter of the Advanced MicroDevices Company. When enabled, the shifter 69 shifts received data bits either one or two bit positions to the right, or one bit position to the left, or not at all as directed by a 2-bit field in instructions requiring operation of ALU 70.

The A-register 56 receives multiplexer 42 output bits MD$\phi$-15 upon occurrence of an ACLK signal. However, bits MD13–15 are so applied to register 56 by way of a sign-extend multiplexer 54 which is responsive to predetermined processor instruction bits for selectably extending the binary state of the sign bit MD12 of a linearly coded word to overwrite bits MD13–15 which otherwise usually are employed for subscriber line unit control communication with the common control and service processor 31. If a word having such control bits is to be processed, a coincidence of signals SE and ALUEX causes the multiplexer 54 to select the sign bit MD12 state for substitution in the positions MD13–15 so those bit positions can be used for computational overflow, and so the control bits will not interfere with calculations. Otherwise the sign-extend mutliplexer 54 simply passes bits MD13–15 on to A-register 56 with bits MD$\phi$-12. The output of the register 56 is applied to the A-input of ALU 70 upon appearance of an AEN control signal.

There is an additional path from the bus 59 to the B-input of ALU 70 by way of a range logic circuit 71 and an R-register 72. The range logic is used to restore control bits, eliminated by sign-extend multiplexer 54, to their correct position in the resulting ALU output and to truncate any overflow in that output. This is achieved by recirculating that output through the range logic where the four most significant bits of the work are examined to detect an overflow condition. If all four bits are not in the same state, either positive or negative overflow has occurred, and the least significant 12 bits are forced in register 72 to their maximum 12-bit value based on the binary state of the sign bit and on wired logic. If an overflow condition does not exist, the same 12 bits from the processed data bus 59 are held in register 72 to be later coupled directly to the ALU B-input. To restore the three control bits, the original word (before sign-extend) is drawn again from memory 32 to the B register 53 and from the B-register through a circuit 64 to the range logic to be recombined in register 72 with the low order 13 bits for application to the B-input to the ALU. At this time the A-register 56 is disabled and the full character at the B-input is then passed out to an instruction-prescribed destination.

ALU 70 utilizes the Texas Instruments type 74S381 ALU circuits in conjunction with 74S182 look-ahead carry generators. ALU 70 combines signals at its A- and B-inputs in a type of operation directed by an ALU bit field in instructions to the processor 12. The output of ALU 70 is applied to any one of a Y-register 73, a Z-register 76 (selected by respective clock signals YCLK or ZCLK generated by insruction destination bit fields and by office clock signals), an input of the pointer register input multiplexer 57, or to a flag logic circuit 77. Outputs from the Y- and Z- registers 73 and 76 go to the processor output port circuit 38 and to the processed data bus 59.

Pointer register 58 receives the 11 least significant bits of the 16-bit data words by way of multiplexer 57 from either the input port circuit 43 or the output of the ALU 70 depending upon whether or not the ALU is enabled by an ALUEX signal. Outputs from register 58 are used in the tandem multiplexers 46 and 33 for addressing call buffer memory 32. Under certain instruction bit field conditions it is also used to address the data memory 30 by way of a multiplexer 78 during processor operation portions of the C/P signal cycle time division. This latter use of pointer outputs for addressing data memory facilitates, for example, the formation of gain tables for the ROMs 63 or the multiplexing of multiple subscriber signal samples onto one output coaxial call channel from the switch.

The flag logic 77 in FIG. 3 illustratively detects an all-ZERO condition in the output of ALU 70 and uses it to sample the states of two instruction bits, when the ALU 70 is enabled, for generating a flag signal which determines whether or not the next one or more conditional instructions, to be described, will be executed.

Command register 47 temporarily stores 16-bit instructions from program memory 28 to provide instruction bits OPA$\phi$-15 shown in the register representation in FIG. 3 and variously utilized by processor 12 and associated circuits. In addition, decoding logic coupled to various bit field outputs develops the clocking, enable, and control signals for processor 12 as indicated in FIG. 3. The instructions are of three principal types, and FIG. 5 shows the various instruction bit fields in each type. These three types used in the pesent illustrative embodiment include signal conversion (CONV) instructions, signal moving (MOV) instructions, and arithmetic/logic unit (ALU) instructions. In all three types the three most significant bits OPA13-15 (OP1-3 in FIG. 5) provided by register 47 comprise an operation code having one of eight values shown in Table I along with the corresponding directed function.

Table I

| OP Code Value | Instructed Function | Decoded Control Signal |
|---|---|---|
| 0 | NOP/CONV | — |
| 1 | move Y to memory | YEN |
| 2 | move C to memory | CEN |
| 3 | move B to memory | BEN |
| 4 | move memory to B | BCLK |
| 5 | move memory to A | ACLK |
| 6 | move memory to Ptr | PCLK |
| 7 | ALU operation | ALUEX |

"Memory" has reference to an addressed location in either memory 30 or memory 32. The code value $\phi$ is construed by the machine as a no operation (NOP) code except in those cases where the register 47 output bit OPA11 is in the binary ONE state and bit OPA12 is in the binary ZERO state. In the latter case, the instruction is construed as a CONV instruction. Except for these CONV instructions, processor 12 is caused to be idle by the NOP code even during those office clock times when call buffer memory 32 is otherwise available to the processor. The value 7 of the operation code field requires that an ALU operation be performed, and this value of the operation code bits is used to enable ALU 70 operation according to one of eight different functions identified by ALU code bits OPA5-7.

A conditional bit CON (OPA12 in FIG. 3) is utilized in MOV and ALU instructions of FIG. 5 to determine whether or not an instruction is to be executed outright without condition. The CON output of register 47 is NANDed in a gate 44 with the $\overline{\text{FLAG}}$ output of flag logic 77 to produce an EXEC signal which, upon coincidence of a reset flag bit and a set condition bit, disables the decoding logic for OPA13-15. If an instruction is to be executed as determined by a condition, that condition must have been set in a prior instruction in terms of using the output of the arithmetic/logic unit 70 in some predetermined state, i.e., the all-ZERO state as previously indicated for this illustrative embodiment, to set a flag. That flag is set in a way indicated by flag control bits $F_2 F_1$ (OPA$\phi$-1 in FIG. 3) of the same instruction which computes the condition. Thus, the flag control bits have the effects indicated in the following Table II wherein reference to the ALU output means such an output for the mentioned prior instruction which computes the ALU output condition:

TABLE II

| VALUES | FLAG STATE | ALU OUTPUT STATE |
|---|---|---|
| $\phi$ | Set | $\neq \phi$ |
| 1 | Set | $= \phi$ |
| 2 | Set | — |
| 3 | NOP | — |

If an instruction contains the NOP condition in the flag control bits, it simply means that the flag bit cannot be changed regardless of the state of the ALU output. The flag state "Set" means a binary ONE output from flag logic 77. Clearly, the flag bit can be forced to the binary ZERO state by an instruction which would, e.g., move a predetermined nonzero constant from data memory 30 through the ALU 70 on a B only operation when the flag control bits have the value 1. Since the required condition is not met by the constant, the flag bit is reset to the binary ZERO state.

For MOV instructions, a sign-extend bit SE (OPA11 in FIG. 3) is interpreted as a direction to extend the state of the sign bit MD12 to bits MD13-15 of a linearly coded data word being moved from multiplexer 42 as already described. Otherwise during MOV instructions, the remaining bits A$\phi$-A1$\phi$ (OPA$\phi$-1$\phi$ in FIG. 3) specify an address in call buffer memory 32 or data memory 30 to which or from which the data is to be moved.

For ALU operations, bits $S_1 S_2$ (OPA1$\phi$-11 and SH$\phi$-1 in FIG. 3) identify one of four selectable data shifts to be accomplished in the shifter 69 as data passes from the bus 59 to the B-input of ALU 70. The available shifts for the values $\phi$-3 of these two bits are two bit positions to the right, one bit position to the right, no shift, or one bit position to the left, respectively. This type of shift direction is utilized when the shifter 69 is enabled by a SEN signal from coincidence logic not separately shown which is responsive to a binary ZERO in any bit of OPA5-7.

ALU instruction bits $IN_1, IN_2$ (OPA8-9 in FIG. 3) designate one of three sources that has its output enabled to provide output signals to be applied to the shifter 69. For the four values $\phi$-3 of these bits the sources selected are none, Y-register 73, Z-register 76, and B-register 53, respectively.

ALU instruction bits $SC_1$-$SC_3$ (OPA5-7 in FIG. 3) define one of eight possible ALU operations according to the following Table III for respective values of these bits.

TABLE III

| BIT FIELD VALUES | ALU OPERATION |
|---|---|
| $\phi$ | B only |
| 1 | B minus A |
| 2 | A minus B |
| 3 | A plus B |
| 4 | A $\oplus$ B |
| 5 | A + B |
| 6 | AB |
| 7 | Range |

The operations indicated for the values 1–3 are arithmetic while those indicated otherwise are logical operations. In addition, the value of RANGE operation causes the REN signal to enable operation of range logic 71.

Finally, the instruction bits OUT1-3 (OPA2-4 in FIG. 3) identify a destination for ALU 70 output signals. In the present embodiment the values 1, 2, and 4 of these three bits are employed and they control the generation of input clock signals for loading one of the Z-register 76, Y-register 73, or pointer register 58.

For signal conversion CONV instructions, ZERO in the OP1-3 and CV2 bits (OPA12-15 in FIG. 3) and ONE in the CV1 bit (OPA11) indicate such an instruction and cause the CCLK signal to be produced to clock converted data into C-register 68 after transmission through converter circuit 61. The R/C bit (OPA1$\phi$ in FIG. 3) indicates whether multiplexer 66 will provide ROM or companded input signals to C-register 68. Bits $SR_2 SR_1$ (OPA8-9 in FIG. 3) are used to initiate the appropriate enabling signal for the source of the signals to be converted, i.e., one of the Y-, Z-, or B-registers. Bits $R_3$, $R_2$, $R_1$ (OPA5-7 in FIG. 3) name one of the ROM tables to be used for the conversion, as previously outlined in connection with FIG. 3, according to their values as indicated in the following Table IV:

Table IV

| ROM bit Values | ROM Table Functions |
|---|---|
| 0 | 2 db attenuation |
| 1 | 3 db attenuation |
| 2 | 5 db attenuation |
| 3 | 6 db attenuation |
| 4 | 2 db gain |
| 5 | companded-to-linear conversion |

Data memory 30 in FIG. 2 contains both service area word locations and scratch pad (SCR) area word locations. In the illustrative embodiment presented herein, 256 word locations are included in the service area for providing communication between the service processor 31 and the switching processor 12; 640 word locations are included in the scratch pad area; and 128 locations are held in reserve. The latter can, e.g., be used for communication via the external port 34 in FIG. 1.

Data into the data memory 30 appears at an input port circuit 60 from the processed data bus 59, a service in (SRVIN) register 79, or a common control input (CCPIN) register 80. Output from the memory 30 appears at an output port circuit 81 from which it is applied to an input of the multiplexer 42, a service out (SRVOUT) register 82, or a common control processor output (CCPOUT) register 83. Control signals have been already described for clocking data into and enabling read-out from the aforementioned registers 79, 80, 82, and 83 in connection with the discussion of circuits for interfacing the common control processor 29' with the switching processor 12.

The multiplexer 78 provides address signals to the data memory 30 from one of four selectable sets of input signals as determined jointly by the clock division signals C/P and by PEN signals defining periodically occurring access-availability times for processors 12 and 29' as illustrated in FIG. 6. Processor 12 addresses memory 30, from outputs of register 47 or register 58, during times when that processor has access to memory 32. Similary CCP 29' addresses memory 30, from register 50, during times when that processor is permitted access as shown in FIG. 6. Otherwise, address is determined by outputs of clock counter 37.

One set of selectable address signals includes the signals CCPφ-11 provided from the address register 50. Bits φ-9 in this set of signals allow the common control processor 29' access to both the scratch pad memory area and the service area. Bit 11 indicates addressing of memory 30 or memory 28, and bit 10 is reserved as far as memory 30 is concerned. Data signals associated with addresses are coupled by way of the CCPIN and CCPOUT registers 80 and 83, respectively.

A second set of the selectable address signals includes output bits CT2-1φ from the office clock counter 37 for accessing service area locations in memory 30 in a fixed sequence. This access occurs during every eighth clock time (as shown in FIG. 6) for reading the memory out to the SRVOUT register 82 or writing into the memory from the SRVIN register 79 on alternate ones of such accesses whether or not data actually flows at those times. The bits CT4-1φ are advantageously employed as the seven least significant address bits defining 128 contiguous locations. Bit CT3 is used as the next most significant bit to apply those addresses to one or the other of two 128-location blocks, i.e., the SRVI and SRVO blocks. Bit CT2 is similarly used as a further more significant bit to address a different 128-location block for use in the EXTI and EXTO functions indicated in FIG. 6. Bits φ, 1 are not directly used for addressing memory 30.

The third set of address signals for multiplexer 78 includes instruction bits OPAφ-1φ from the command register 47 for defining a location in either the service area (to extend service processor communications to the switching processor 12) or the SCR area (to place data for future use or to use data previously stored there). Bits φ-9 indicate the address in memory 30, and bit 1φ indicates addressing of that memory or memory 32. Data read out or written in by processor 12 necessarily passes by way of the processed data bus 59 or the multiplexer 42.

A final set of selectable address signals for multiplexer 78 includes output bits PTRφ-1φ from pointer register 58 to provide access to the SCR ara for switching processor 12. These bits are applied the same as the aforementioned bits OPAφ-1φ. Data corresponding to these addresses is communicated by way of bus 59 and multiplexer 42, for example, for accessing tables or to use a new or currently computed pointer to access an address in the SCR area for data to go to an output coaxial line channel, e.g., an SCR summing register for conference call processing.

A WRTDM signal from logic 86 enables writing into data memory 30. That signal is obtained from OR-type logic to enable writing when the various address and data sources have their respective opportunites to write. For example, WRTDM appears during each SRVI time in wave A of FIG. 6. It also appears in CCP times of the same wave if CCP 29' has sent a signal indicating a need to output data to memory 30. WRTDM also appears during switching processor times of wave A if e.g., processor 12 move instructions have indicated a memory 30 (or register 58) address as a data destination and the EXEC signal is high.

Illustrative programs and instruction information for call switching and other network signal processing in switching processor 12 are now considered. Only illustrative basic capabilities of processor 12 in an office switch environment are discussed. It will be apparent to those skilled in the art that the microprocessor-type architecture of processor 12 is capable of much more.

For example, conversions between companded and linear coding formats can be achieved in network signal processing by software using well-known algorithms; but since they consume substantial processor time, hardware has been used for the routine conversions.

Network switching processor 12 instruction and notation definitions:

| | |
|---|---|
| mov | move instruction |
| alu | arithmetic logic unit instruction |
| cmov | conditional move instruction (if flag is set) |
| calu | conditional alu instruction (if flag is set) |
| mov se | move inst. with 13-bit data, sign extended to 16th bit position, and route indicated as source->destination |
| CONV | convert instruction moves a 16-bit word from a source register through logic 61 into C register with selectable conversion type and ROM level change tables |
| | C companded to linear |
| | L linear to companded |
| | CRφ,1, companded to companded 2,3,4 through one of five different level changing ROMs of predetermined gain or loss capability. |
| A B Y Z | machine registers |
| P | computed address pointer register |
| zf nf | zero/nonzero alu output sets flag |
| (A + B) | alu or shift functions |
| | <<1 left shift one bit position toward MSB |
| | >> 1,2 arith. right shift one or two bit positions toward LSB |
| | + add |
| | − subtract |
| | & logical AND |
| | \| logical OR |
| | ∧ logical EXCLUSIVE OR |
| | range 14 bit data adjusted for under- or overflow and 3 control bits from B inserted hexidecimal constants begin with an X: XOOff,XcOcO. Each numerical digit following the X represents four binary coded bits of the value of the digit. Each alphabetic digit, e.g., a through f, represents a different set of four binary coded bits having values $12_8$ through $17_8$, respectively. Thus, four hexidecimal digits define a 16-bit mask or a 16-bit constant. |

There follow some sample programs. In the interest of a clear presentation, an all linear system has been assumed so that the various CONV instructions could be omitted since each involves only moving data into the converting logic 61 and following with a move instruction to pass the result from C-register 68 to circuit 38 or other appropriate destination.

The following subroutine is used for conference call initialization to clear any unwanted data from memory 30 SCR locations to be used for the call:

| | | |
|---|---|---|
| mov | XOOOO->B | /contents of memory 30 address containing XOOOO to B register 53 |
| mov | B->confsum1 | /initialize conference call sum registers in data memory 30 |
| mov | B->confsum2 | |
| mov | B->confsumN | |

Routine call switching is accomplished by the following subroutine for a standard path:

| | |
|---|---|
| mov | mouth1->B |

-continued

```
mov        B->ear2
mov        mouth2->B
mov        B->ear1
```
It is apparent that a fan-out capability is achieved by
following the second above instruction with others to
move the same B register content to ear 3, ear 4, . . . ear n.
However, only one of those n recipients can respond at
at time. Call signal level change is accomplished by
replacing the first ear signal instruction by, e.g.,
```
CONV   CR1
mov    C->ear2
```
Similar changes are effected in any subroutine for
signal level or for code format. It will be appreciated
by those skilled in the art that this capability for
customizing signal level in the signals to and from
each subscriber offers the potential for reducing any
tendency toward instability in conference call connections.

In a conference call, a subscriber's mouth signal is
added to conference sum signal by:

| mov    | confsum->A  | conference summing register |
|--------|-------------|-----------------------------|
| mov.se | mouth->B    | /sign extended mouth signal sample |
| alu    | (A + B)->Y  |                             |
| mov    | Y->confsum  | /updated conference sum.    |

Subtracting a subscriber mouth signal from the conference sum and returning the difference to same subscriber is done by:

| mov    | confsum->A  | /conference summing register |
|--------|-------------|------------------------------|
| mov.se | mouth->B    | /sign extended mouth signal sample |
| alu    | (A − B)->Z  |                              |
| alu    | (Z range)->Z | /over-underflow correction  |
| mov    | Z->ear      | /sum of other mouths.        |

It is also possible with the switching processor 12 to multiplex data signals, i.e., signals from business machines, occurring at different bit rates from different subscribers onto a common output time channel going to a common subscriber destination. For example, if there are three subscribers A, B, and C supplying data at rates of 16 kilobits/second, 16 kilobits/second, and 32 kilobits/second, respectively, their needs can be adequately satisfied by allotting the subscribers A, B, and C bit groups of 2, 2, and 4 bits in size, respectively, in each outgoing (ear sample) sample word for the common time channel. One illustrative program for effecting this result follows. In conjunction with the loading of this program in memory 28, CCP 29' causes to be loaded in the SCR area of memory 30 two constant masks X0003 and X000f, for combining with respective input sample words to limit the useful bits therein to those required for the respective subscribers. An illustrative multiplexing program follows:

| mov  | X0003->A    |                              |
|------|-------------|------------------------------|
| mov  | mouth A->B  |                              |
| ALU  | (A&B)->Y    | / mask A's data (mouth) sample into Y register. |
| mov  | X0003->A    |                              |
| mov  | mouth B->B  |                              |
| ALU  | (A&B)->Z    | / mask B's sample into Z.    |
| ALU  | (Z<<1)->Z   | / shift B's sample left by size of A's bit block. |
| ALU  | (Z<<1)->Z   |                              |
| mov  | Z->route    | / move B's sample to memory 30 en route to A register. |
| mov  | route->A    |                              |
| ALU  | (A+Y)->Y    | / puts A and B samples into Y register. |
| mov  | X000f->A    |                              |
| mov  | mouth C->B  |                              |

-continued

| ALU  | (A&B)->Z    |                              |
|------|-------------|------------------------------|
| ALU  | (Z<<1)->Z   |                              |
| ALU  | (Z<<1)->Z   |                              |
| ALU  | (Z<<1)->Z   |                              |
| ALU  | (Z<<1)->Z   |                              |
| mov  | Z->route    |                              |
| mov  | route->A    |                              |
| ALU  | (A+Y)->Y    |                              |
| MOV  | Y->earcom   | / move single word with all of A-C samples to output channel earcom location in memory 32. |

Another way to accomplish multiplexing of plural subscriber signals onto a common output channel is to assign the mouth signals from the respective subscribers to the output channel in a recurring sequence of those subscribers. For this arrangement each of the n subscribers must repeat his signal for n sample times and this effective bit throughput is (8KHz/n) × 13 bits per second. The signals are otherwise received in the usual manner and moved to a prescribed location for that subscriber in the SCR area of memory 30. Also held in that area is a pointer initially containing the address in memory 30 assigned to the first of the n subscribers, a constant equal to that initial address, a constant equal to unity for incrementing the pointer, and a constant equal to the valve n for utilization in processing the multiplexing operation.

At a convenient time in the instruction sequence from program memory 28 after the subroutine for loading the last of the n subscriber samples into data memory 30, there is loaded into the memory 28 a subroutine which effects the outputting of those samples in the aforementioned recurring sequence. In substance this subroutine involves reading the pointer into pointer register 58, using that value through multiplexer 78 to address memory 30 for reading the subscriber location to the B-register 53 from which the signal is then outputted to the ear location of the common output channel. The pointer is then incremented by moving its value from the SCR area to the B-register, moving the unity constant to the A-register, and adding the two in the ALU. The sum is returned to the pointer location in memory 30 and also held in pointer register 58. Next the processor instructions move the constant n to the A-register 56, and an ALU subtraction operation is performed with respect to the unincremented pointer then still in the B-register 53 with the result being utilized to set the output of flag logic 77 if the difference is zero. Thereafter, in conditional move operations the pointer initial value constant is moved to the B-register and returned to the pointer location in memory 30. As a consequence, the initial value of the pointer is used to overwrite the incremented value only if the preincrementing value had been n. Thus, in each sample time the samples from the different subscribers are collected and a different one, in each successive sample time, is sent out on the common output channel.

It can happen that a subscriber having only a single line wants to transmit simultaneously a voice signal to one destination and either related or unrelated data signals to a different destination. This is also possible with the switching processor 12 presented herein. Assuming, e.g., a linearly coded 13-bit voice signal and a system in which only two of the three control bits as hereinbefore discussed are required for service, there is then one full bit in each 16-bit word multiplexed onto the office coaxial circuits used by the subscriber. That one bit represents an 8KHz data transmission rate in the illustrative system here under consideration. A higher rate of 48KHz is possible if the voice is in an 8-bit companded code. It is also often possible, at least in linearly coded systems, to give up an additional one or two of the least significant bits — at some sacrifice in quality of voice reproduction which the subscriber may be willing to tolerate — to enlarge the data transmission capability. In either the companded or the linear case, the voice signal is processed in the usual fashion, ignoring any data bits not needed for voice, to its unique destination in, e.g., the outgoing buffer store 13 in FIG. 1. The data information is then extracted by appropriate masking and processed in the usual way to its unique destination in the output store 13. If a voice call is in progress when it becomes necessary to set up a data call involving the same subscriber line, one of the aforementioned control bits is used to alert the office to the need to collect data bits in memory 30 service area in successive sample times to obtain call destination information. Techniques as outlined for the multiplexing program are used to load those bits into different bit parts of an assigned service area word.

Figure 7:
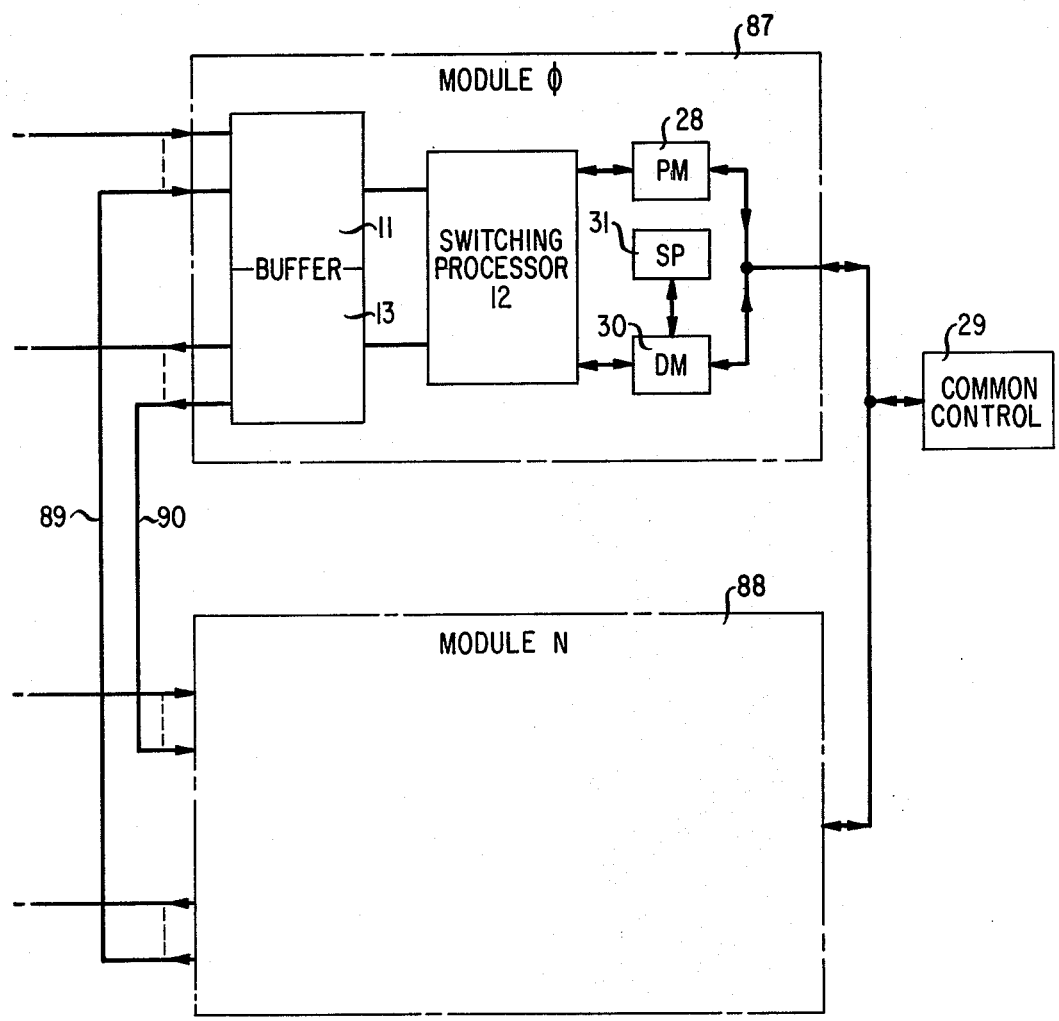
FIG. 7 is a block and line diagram illustrating one way to interconnect plural switch modules of the type shown in FIG. 1.

FIG. 7 illustrates one arrangement for interconnecting plural switch modules of the type illustrated in FIG. 1 to cooperate with a single common control 29 for enlarging traffic handling capabilities of an office. Each module, only module number φ and module number N (otherwise designated 87 and 88) being actually shown in FIG. 7, includes a switching processor and associated buffer stores, data memory, program memory, and service processor. Buffer storage arrangements of the type shown in FIG. 1, and enlarging processor 12 address capability, allow each module switching processor to go to full capacity. One common control processor 29' implemented by the indicated LSI-11 computer accommodates about four such modules working through its typical bus facilities. In order to allow any subscriber to reach any other subscriber, an output coaxial circuit of each module is coupled to an input coaxial circuit of each other module as indicated by the circuits 89 and 90 in FIG. 7.

Although the present invention has been described in connection with a particular embodiment thereof, it is to be understood that additional embodiments, modifications, and applications which will be obvious to those skilled in the art are included within the spirit and scope of the invention.

What is claimed is:

1. A switch for interconnecting respective digital call signals of different communication call paths between randomly selectable switch ports corresponding to the paths, the switch comprising
 means for storing the signals of input ports of said switch in a first predetermined series of storage locations, respectively,
 means for variably processing said stored signals in accordance with predetermined subroutines related at least to effecting said randomly selectable interconnecting of signals and optionally selectable additional subroutines related to predetermined characteristics of a communication call of which said signals are a part, to produce processed call signals, and
 means for storing said processed signals in a second predetermined series of storage locations corresponding to output ports, respectively, of said switch.

2. A communication system switch for coded digital signals and comprising
 first means for storing coded digital signals in a first series of storage locations,
 second means for storing coded digital signals in a second series of storage locations,
 means for variably processing coded digital signals from said first storing means for at least coupling those signals to randomly selectable locations of said second storing means for thereby effecting call signal connections through said switch, and
 the processing means including at least one storage register for temporarily holding any given digital signal in the processor during transit through the processor.

3. The switch in accordance with claim 2 in which said processing means further comprises
 means for selectably executing additional programmable processing of signals coupled through said processing means.

4. The switch in accordance with claim 3 and comprising in addition
 means for supplying a recurrent train of multibit instructions for controlling said processing means, and
 means responsive to a predetermined bit field in each of said instructions for conditionally enabling or disabling execution of such instruction by said processing means as a function of the state of a predetermined signal in said processing means.

5. The switch in accordance with claim 3 in which said selectable executing means includes means for changing the signal level of coded digital signals coupled by said processing means between said first and second storing means.

6. The switch in accordance with claim 3 in which said selectable executing means includes means for changing the type of coding of said coded digital signals coupled by said processing means between said first and second storing means.

7. The switch in accordance with claim 2 in which said processing means includes means for multiplexing a plurality of said digitial signals in different ones of said locations of said first storing means into one of said locations of said second storing means.

8. The switch in accordance with claim 7 in which each of said locations of said first and second storing means includes a predetermined number of bit storage positions,
 each of said plurality of digital signals requires only a part of the location bits of one location for the significant information of such signal and the sum of the bit parts is equal to or less than said predetermined number, and
 said processing means includes
 a register for collecting the significant bit parts of said plurality of digital signals of said first storing means into different bit part positions of said collecting register, and
 means for placing the contents of said collecting register into said one location of said second storing means.

9. The switch in accordance with claim 7 in which means are provided for loading a different set of digital signals into said first storing means locations in successive signal sample times, and
 said multiplexing means comprises means for coupling said digital signal in different ones of said locations of said first storing means into a predetermined one of said locations of said second storing means in a recurring sequence of said first storing means locations in successive sample times.

10. The switch in accordance with claim 2 in which each of said locations of said first and second storing means includes a predetermined number of signal bit storage positions, and said processing means includes means for coupling different bit position parts of a digital signal stored in a location of said first storing means to different locations, respectively, of said second storing means.

11. The switch in accordance with claim 2 in which said processing means includes means for arithmetically accumulating in each sample period a plurality of said digital signals in different locations of said first storing means to form a conference call sum, and means for separately subtracting each of said signals of said plurality from said sum and moving the resulting separate difference digital signal to a location of said second storing means corresponding to the first storing means location of the subtracted digital signal.

12. The switch in accordance with claim 2 in which said processing means comprises an input signal port, an output signal port, multiple signal paths extending between said input and output ports, and in one of said paths there is included said one storage register and in each other one of said multiple paths there is included at least one additional temporary storage register.

13. The switch in accordance with claim 12 in which one of said processor multiple signal paths includes in addition a second temporary storage register and an arithmetic logic unit connected in tandem between the one register and the second register in such path.

14. The switch in accordance with claim 13 in which said processing means comprises a pointer storage register, and means for selectably coupling as input to said pointer register either said processor input port or an output of said arithmetic/logic unit, and said switch comprises a data memory selectably addressable by plural sources to exchange data with said processing means, and means for coupling an output of said pointer register to provide one of said plural sources.

15. The switch in accordance with claim 2 in which said processing means comprises means for storing a separate processing means instruction sequence for each call connection effected through said switch, and means, responsive to said instruction sequences, for controlling said processing means to effect said call connections.

16. The switch in accordance with claim 2 in which said processing means comprises a programmable signal processor, means are provided for storing a separate processor instruction sequence for each call connection effected through said switch, means, responsive to said instruction sequences, are provided for controlling said processor to effect said call connections, means are provided for loading a different set of digital signals into said first storing means locations in successive signal sample times, and said instruction sequence storing means includes means for reading out all of said sequences to said processor controlling means once in each of said sample times.

17. The combination in accordance with claim 2 in which each of said first and second storing means includes a different pair of memories, means are provided for writing a different set of digital signals into alternate memories of said pair of memories of said first storing means in successive signal sample times and for reading out a different set of digital signals from alternate memories of said pair of memories of said second storing means in said successive signal sample times, and means are provided in each of said sample times for coupling said processing means to the one of said memories in each of said pairs which is in that sample time not being written into or read out of by said writing and reading means.

18. The combination in accordance with claim 2 in which said first and second storing means comprise first and second parts of a common storing means, each of said parts having an odd sample time sector and an even sample time sector, means for writing a different set of digital signals into said even sector of said first part in a first portion of each even sample time and for reading out a different set of digital signals from said even sector of said second part in a second portion of each even sample time, said writing and reading means similarly writing and reading said odd sectors of said first and second parts in each odd sample time, and means for coupling said processing means to said odd sector of said first part and to said odd sector of said second part in a third portion of each even sample time, said coupling means similarly coupling said processing means to said even sectors of said second part in each odd sample time.

19. The switch in accordance with claim 2 in which said processing means comprises a programmable signal processor and means for supplying signals to control said processor, and said first and second storing means comprise means for addressing said storage locations from selectable ones of said control signal supplying means signals for communicating said coded digital signals between said storing means and said processor.

20. The switch in accordance with claim 19 in which said processing means comprises means for supplying a periodically recurrent sequence of address signals, and said addressing means comprises means for periodically alternately addressing said first and second storing means from said control signal supplying means and said periodic address signal sequence supplying means.

21. The switch in accordance with claim 20 in which said addressing means further comprises means, responsive to a predetermined state of said processor control signals for substituting for said control signal supplying means, to address said storage locations, a set of digital coded signals from a register of said processing means.

22. The switch in accordance with claim 2 in which said processing means comprises
- a data memory,
- a programmable signal processor having an input port and an output port,
- first means for recurrently alternately coupling said input port to receive data signals from said first storing means and said data memory, and
- second means for recurrently coupling said output port to supply data to said second storing means.

23. The switch in accordance with claim 23 in which means are provided for operating both of said recurrent coupling means so that the couplings of said input and output ports to said first and second storing means and said data memory at least partially overlap in time.

24. The switch in accordance with claim 22 in which means are provided for receiving coded digital signals,
said second recurrent coupling means includes means for alternately coupling said output port to said second storing means and said receiving means signals to said first storing means, and
means are provided for operating the last-mentioned alternate coupling means and said first recurrent coupling means so that the coupling of said receiving means to said first storing means and of said data memory to said processor input port at least partially overlap in time.

25. The switch in accordance with claim 2 in which there are provided
- means for receiving coded digital signals,
- means for presenting switched coded digital signals for transmission, and
- means for recurrently alternately coupling (a) said receiving means to said first storing means input or said second storing means output to said presenting means and (b) said processing means to said receiving means and said presenting means.

26. A communication system switch for coded digital signals and comprising
a plurality of switch modules each including
- first means for storing coded digital signals in a first series of storage locations,
- second means for storing coded digital signals in a second series of storage locations,
- means for variably processing coded digital signals from said first storing means for at least coupling those signals to randomly selectable locations of said second storing means for thereby effecting call signal connections through said switch, and
- the processing means including at least one storage register for temporarily holding any given digital signal in the processor during transit through the processor, and
means for interconnecting said second storing means of each of said modules to supply signals to said first storing means of selectable ones of all others of said modules.

27. A communication system switch for coupling any one of a plurality of received call signal samples from different sources to any one of a plurality of call signal destinations, said switch comprising
- first signal storing means having a signal sample storage location for each of said sources,
- second signal storing means having a signal sample storage location for each of said destinations, and
- means for selecting signal samples from said first storing means in any order, regardless of destination for each such sample, and coupling such sample into said second storing means at a location determined by said destination for such signal sample.

28. The switch in accordance with claim 27 in which each of said samples is at least one bit of a coded digital signal.

29. The switch in accordance with claim 27 in which said selecting and coupling means comprises means for variably processing said signal samples, said processing including at least the coupling of each signal sample in said first storing means to any predetermined location in said second storing means.

* * * * *

UNITED STATES PATENT AND TRADEMARK OFFICE
CERTIFICATE OF CORRECTION

PATENT NO. : 4,112,258
DATED : September 5, 1978
INVENTOR(S) : Harold G. Alles

It is certified that error appears in the above-identified patent and that said Letters Patent are hereby corrected as shown below:

Column 9, line 12, "cloced" should be --clocked--; line 13, "form" should be --from--. Column 11, line 21, "in gate" should be --in a gate--. Column 12, line 63, "25510" should be --25S10--. Column 14, line 20, "pesent" should be --present--. Column 17, line 41, "ara" should be --area--. Column 18, line 14, "mov se" should be --mov_se--; between lines 62 and 63, insert under the "B" in "B->confsum2" three vertical dots. Column 25, line 18, "23" should be --22--.

Signed and Sealed this

Seventeenth Day of July 1979

[SEAL]

Attest:

LUTRELLE F. PARKER

Attesting Officer  Acting Commissioner of Patents and Trademarks